Aug. 24, 1943.     L. J. NOWAK, JR     2,327,367
MATERIAL HANDLING AND WEIGHING MACHINE
Filed Dec. 8, 1937     4 Sheets-Sheet 1
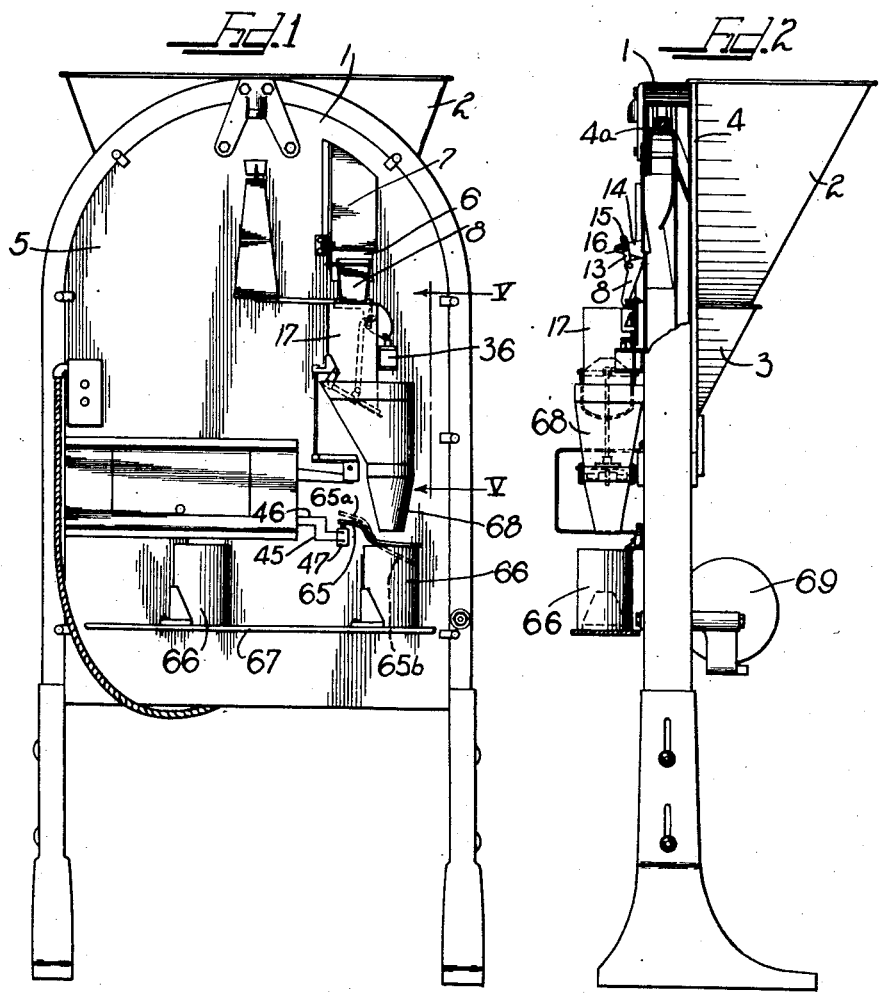
Inventor
LEON J. NOWAK, JR.
by Attys.

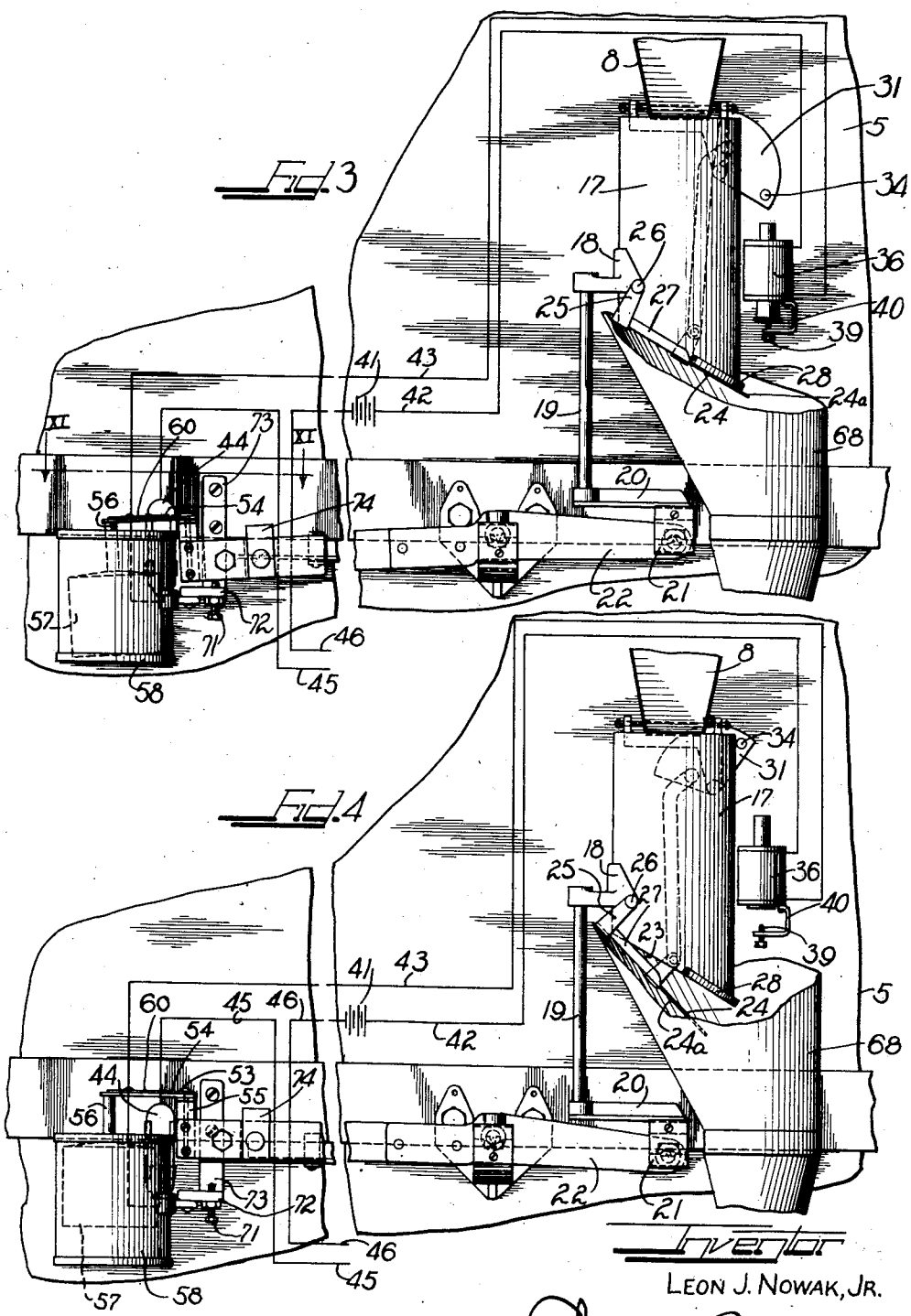

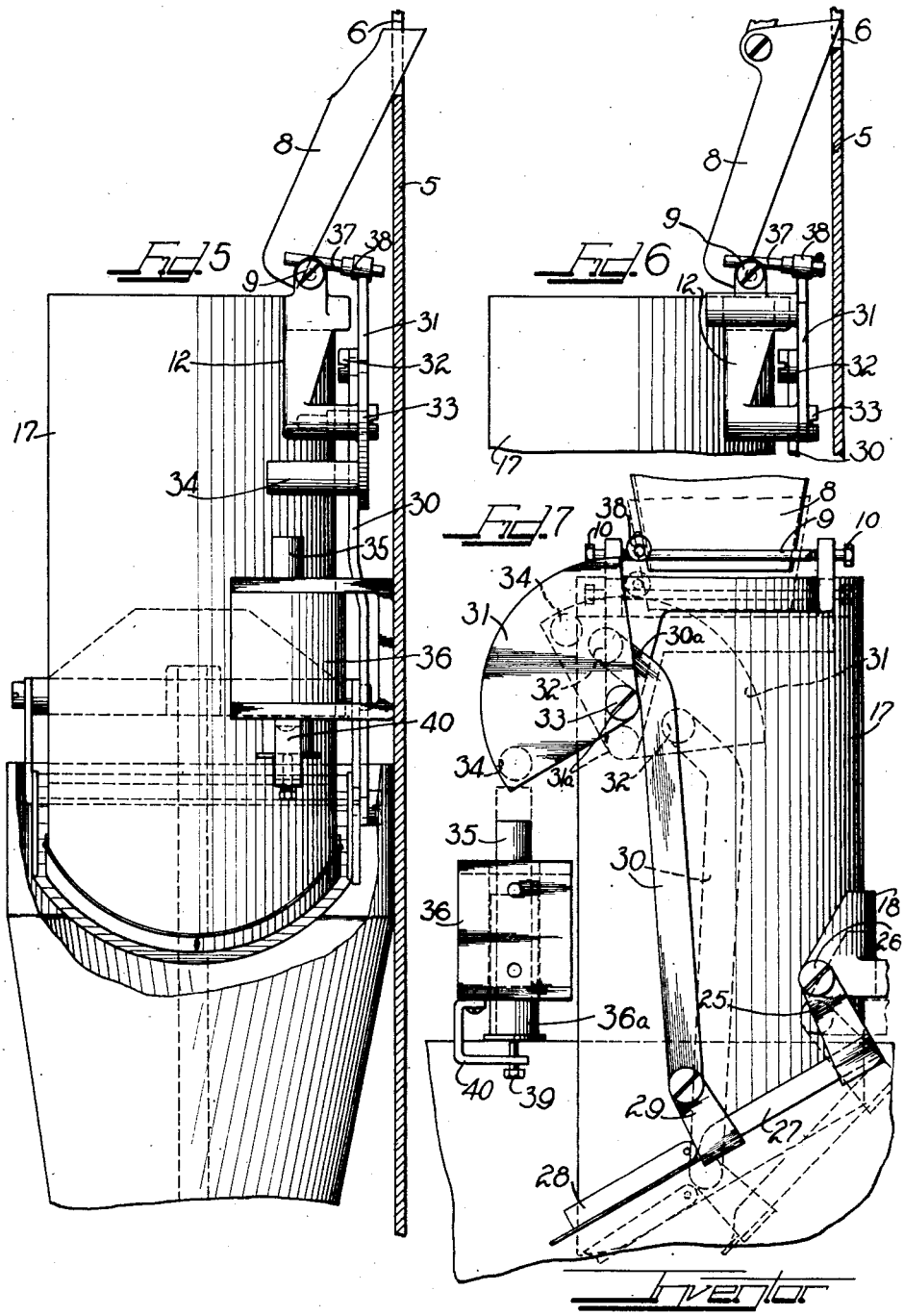

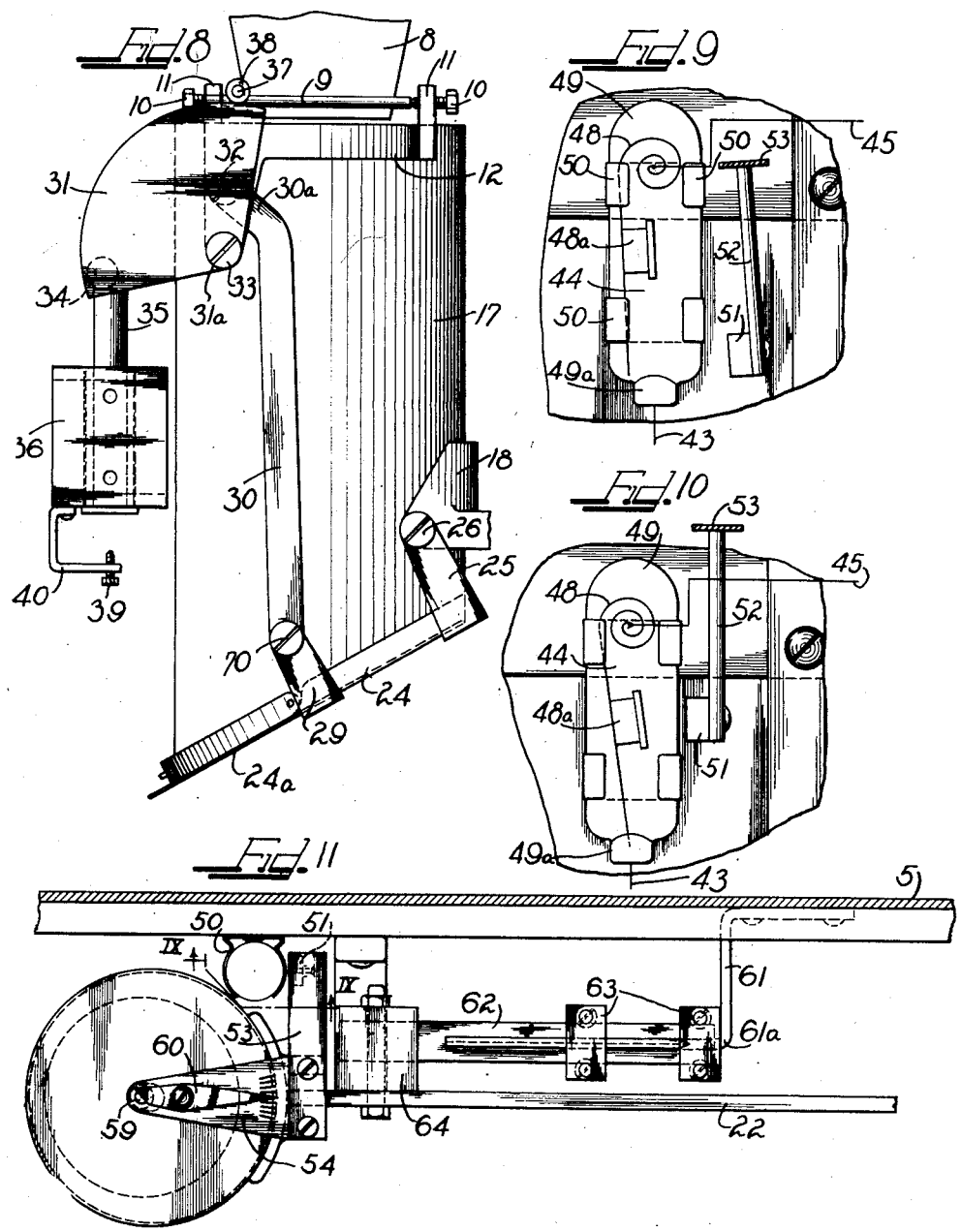

Patented Aug. 24, 1943

2,327,367

UNITED STATES PATENT OFFICE 2,327,367

MATERIAL HANDLING AND WEIGHING MACHINE

Leon J. Nowak, Jr., Chicago, Ill.

Application December 8, 1937, Serial No. 178,687

13 Claims. (Cl. 249—17)

This invention relates to a material handling and weighing machine in which a predetermined quantity of material is weighed and discharged.

It is an object of this invention to provide means for automatically discharging the weighed contents when the correct weight has been obtained.

It is a further object of this invention to provide a machine of this type that is very accurate in its operation and that is only operative under predetermined conditions.

It is further an object of this invention to provide means whereby such machine may be controlled by the bag or container that receives the weighed product.

With these and other objects in view which will become apparent as the description proceeds, this invention comprises the novel structure and combination of parts hereinafter described and more particularly pointed out and defined in the appended claims. In the accompanying drawings which illustrate a preferred form of this invention and in which similar reference numerals refer to similar features in the different views:

Figure 1 is a front elevational view of a weighing machine involving this invention.

Figure 2 is a side elevational view of said machine.

Figure 3 is an enlarged fragmentary elevational view illustrating parts in certain positions.

Figure 4 is a view similar to Figure 3 with the parts shown in different positions.

Figure 5 is a fragmentary part elevational and part sectional view with parts broken away taken substantially upon the line V—V of Figure 1.

Figure 6 is an enlarged fragmentary elevational view of the upper part of Figure 5 showing parts in different positions.

Figure 7 is an enlarged fragmentary elevational view of the weighing container.

Figure 8 is an enlarged elevational view similar to Figure 7 with parts in different positions.

Figure 9 is an enlarged elevational view of a mercoid switch taken substantially upon the line IX—IX of Figure 11.

Figure 10 is a view similar to Figure 9 with parts in different positions.

Figure 11 is an enlarged top plan view of certain parts taken substantially upon the line XI—XI of Figure 3.

The illustrated apparatus comprises a narrow casing 1 which is arcuate at its upper end into which comminuted material may be fed through a hopper 2 that discharges into a chute 3 extending thru the back plate 4. The material that is fed into the casing descends into a rotatable conveyor ring 4a that elevates the material and discharges the same in the form of a stream back into the conveyor ring.

In the front plate 5 of the casing, there is an opening 6 adjacent the discharged stream of material. The upper part of this opening is closed by a door 7. A movable deflector 8 is adapted for moving into the stream of material for deflecting a portion thereof for filling a container or the like to a certain weight and then moving out of the stream as the container is being filled.

The invention herein concerns itself more particularly with means for automatically controlling the discharge of weighed quantities of material from a receptacle forming a part of the apparatus. Such discharge of material from the receptacle may also be made dependent upon the placing of a container in position to receive the discharge from the receptacle.

In the instant case, the deflector 8 is provided with a pintle rod 9 which may be welded or secured thereto as clearly shown in Figure 8. Adjustable pivot screws 10 threaded thru ears 11 on a bracket 12 extend into bearing recesses in the ends of the rod 9 for pivotally sustaining the deflector. The pintle rod 9 is attached to the lower portion of the deflector. The upper portion of the deflector is pivotally connected by a link 13 (Figure 2) with a bracket 14 upon the front plate 5 of the casing. The connection between the link 13 and bracket 14 is a lost motion connection to allow the deflector 8 to move downwardly and outwardly and inwardly with respect to the casing. Such a connection preferably consists of slots 15 in the link and bracket 14 for the pivot pin 16.

The aforementioned pintle supporting bracket 12 is secured to a material confining receptacle 17 having a bracket 18 secured thereto adjacent its lower end. The upper end of a vertical rod 19 (Figures 3 and 4) is secured to this bracket.

The lower end of the vertical rod is secured to an arm 20 which is attached to a connection 21 having the usual knife edge bearing with a scale beam 22. Thus the receptacle 17 is made responsive to the movements of the scale beam.

The receptacle 17 has its lower end cut on a bias as indicated at 23 (Figure 4). The lower end of the receptacle is closed by a door or gate 24. The door 24 has side lugs 25 that are pivoted to the bracket 18 as indicated at 26. The door 24 consists of an oblong metal plate 24a that carries an arcuate flange 27 upon its rear portion for lapping over the lower edge of the receptacle.

The lower forward end of the receptacle is provided with a flanged rim 28. This construction is designed to prevent the escape of material between the receptacle and gate when the latter is in its closed position.

The door 24 is adapted to be automatically opened by the weight of the material in the receptacle when said door is released as will later be explained. The door is however designed to automatically swing to its closed position by its own weight.

It will be noted that the plate 24a and the flange 27 are exceedingly light and the downward component of force thereof together with the parts connected thereto is overbalanced by the component of force arising from the lugs 25 tending to swing downward by gravity on pivots 26 when the door is opened as shown in Figure 4.

Upon one side of the gate 24 there is a vertical lug 29 best shown in Figs. 7 and 8. A flat link 30 is pivoted at its lower end to the lug 29. The upper end of this link is offset as indicated at 30a and this offset end is pivoted to a sector shaped plate 31 as indicated at 32. The sector shaped plate 31 has its apex 31a directed downwardly and pivoted to the bracket 12 as indicated at 33 in Fig. 8. This sector plate 31 is designed to be swung from the full line position shown in Fig. 7 to the dotted line position to bring the pivot point 32 slightly beyond dead center with respect to the pivot point 33 to allow the weight of material to automatically open the gate 24 for discharging the contents of the receptacle 17.

When the door 24 automatically swings to its closed position, it will elevate the link 30 and swing the sector shaped plate 31 to the full line position shown in Fig. 7 in which position, an abutment 34 on the plate will be in the path of movement of the plunger 35 of a solenoid having a coil 36 which may be suitably supported from the front plate 5. When the plunger 35 is elevated as shown in Fig. 8 the pivot point 32 of link 30 is swung beyond dead center with respect to pivot point 33 allowing the gate to automatically open.

The sector shaped plate 31 is designed to prevent the deflector 8 from moving into the stream of material when the gate is open. To this end, a rod 37 (Figs. 5 and 6) is attached to one side of the deflector and a roller 38 journalled upon said rod is adapted to be engaged by the arcuate edge of the segmental shaped plate 31 when the latter is swung from the position shown in full line in Figure 7 to the position shown in Figure 8, or to the dotted line position shown in Figure 7. It will be noted that when the gate is closed, the sector plate 31 is positioned beyond the roller 38 as shown in Figure 7 full line position, allowing the deflector to swing into the stream of material.

It will of course be understood that when the gate 24 moves to closed position, the pivot point 32 of link 30 will be moved beyond dead center to the left so that the gate will be held in closed position until link 30 is actuated by the solenoid plunger 35.

The solenoid coil 36 is provided with an armature 36a (Figure 7) which is adapted to rest upon an adjustable screw 39 threaded in an L-shaped bracket 40 attached to the base of the solenoid. The aforementioned plunger 35 is connected to and moves with the armature. When the solenoid is energized, the armature 36a is drawn upwardly into the coil for elevating the plunger. When the solenoid is deenergized, the solenoid armature drops down by gravity and lowers the plunger 35.

The solenoid coil 36 is adapted to be energized from any source of electrical energy. In the drawings, there is shown a battery 41 having one of its terminals connected by conductor 42 to one side of the solenoid coil. The other conductor 43 from the other side of the solenoid coil is connected to a mercoid switch 44 best shown in Figures 9 and 10. The mercoid switch is also connected to a conductor 45. The second terminal of the battery is connected with a conductor 46. The conductors 45 and 46 may be connected to a switch 47 which may be controlled by a supplemental machine as will later be set forth.

With reference to Figures 9 and 10, it will be noted that the conductor 45 is connected to a spring conductor 48 constituting a part of the mercoid switch 44. The spring conductor 48 is housed within the glass bulb 49 of the mercoid switch which is held in position by spring clamps 50 suitably secured to the machine. The spring conductor 48 is coiled at its upper end and extends downwardly adjacent the bottom of the bulb which is provided with a reduced cup-shaped portion 49a containing mercury. At an intermediate point, the spring conductor 48 is provided with an armature 48a attached thereto. Due to the tension in the coil of the conductor 48 and the weight of the armature 48a, the conductor normally occupies the position shown in Figure 9. Movable with the scale beam 22, is a magnet 51 which is designed to attract the armature 48a when the scale beam is in substantially balanced position as shown in Figure 10 and cause the lower end of the conductor 48 to dip in the mercury and complete the circuit thru conductor 43 which enters the lower end of the glass bulb and is in contact with the mercury.

The magnet 51 is secured to a rod 52 which is attached to a bracket 53 which in turn is attached to the top of an arm 54 (Figure 11) on the scale beam. With reference to Figure 4, it will be noted that a vertical support 55 is attached to the rear end of the scale beam and that the arm 54 is attached to the vertical support. It might be mentioned that the arm 54 has the stem 56 of a cup-shaped member 57 that extends into a dash pot 58 attached thereto. The stem 56 is provided with an air passage 59 that is adapted to be regulated by a pivoted regulating member 60. This dash pot will dampen the movement of the scale beam and thus increase the operation of the machine. The scale beam is supported as is usual in the art.

In referring to Figure 11, it will be noted that a bracket 61 is attached to the front plate 5 of the machine. This bracket has an outwardly offset arm 61a that extends parallel to the scale beam 22. A leaf spring 62 is secured to the arm of the bracket by means of clamps 63. The leaf spring 62 extends beyond the end of the bracket arm and under a block 64 secured to the scale beam.

The leaf spring 62 is designed to exert a slight upward pressure against the scale beam when the same is in unbalanced position; however, when the rear end of the scale beam rises a predetermined extent, it will pass beyond the influence of the spring. Thus, the leaf spring is merely intended to accelerate the movement of the scale beam a predetermined extent when moving from its unbalanced to its balanced position. The scale beam is supported in the usual manner.

Referring now to Fig. 1, it will be noted that a switch lever 65 is pivoted intermediate its ends to the front plate 5 of the machine. One arm 65a of this lever is adapted to actuate the switch 47 while the other arm 65b lies in the path of a container 66 carried by a conveyor 67 which may be a part of a supplemental machine for closing the container. The arm 65b of the lever is heavier than the arm 65a, with the result that the switch lever 65 will be tilted to normally elevate the arm 65a above the switch. However, as a container 66 engages the arm 65b, it will elevate the same and cause the arm 65a to engage the switch. The container 66 is shown beneath a guide chute 68 into which the weighing receptacle 17 is adapted to discharge. Thus, it becomes impossible to dump the contents of the receptacle 17 until a container 66 is in proper position to receive the weighed quantity.

It is readily apparent that this apparatus is designed to be used also as a continuous feeder for supplying a predetermined volume of material per unit of time. To this end, a screw 70 is used to connect the link 30 and door 24 of the container. By removing this screw 70, the door 24 on the bottom of the receptacle will be maintained open by the flow of material passing through the receptacle 17. This flow of material can be varied as desired by adjusting the deflector 8 into and out of the stream of material.

This adjustment is effected through the instrumentality of a screw 71 (Fig. 4) that is threaded in the horizontal arm 72 of a bracket 73 attached to the front plate 5 adjacent the scale beam. It will be noted that the arm 72 is located beneath the scale beam and that the screw 71 is located in the plane of the scale beam. By adjusting the screw 71, the descent of the rear end of the scale beam can be varied. The counterpoise 74 on the scale beam will, of course, be adjusted to hold the scale beam against the screw 71. As the elevation of the forward end of the scale beam determines the position of the deflector in the stream, it will be evident that the feeding of the material can be varied when the apparatus is used for a volumetric feeder.

In the operation of the apparatus, the ring conveyor is driven by a motor 69, as set forth in my copending application Serial No. 178,688, filed December 8, 1937, for supplying a stream of comminuted material that it is desired to package. With the scale beam properly adjusted in unbalanced position and the circuit open, and the sector plate 31 in the position shown in Fig. 7, the deflector 8 will be free to move into the stream of material, intercept material therefrom and guide the same into the receptacle 17 which is closed at such time. The aforementioned leaf spring will, of course, accelerate the downward movement of the forward end of the scale beam a predetermined extent as the receptacle 17 is being filled to provide a fine dribble when the receptacle is nearly full.

When the scale beam moves to its fully balanced position as shown in Fig. 4, the magnet 51 will have been elevated to attract the armature 48a for closing the mercoid switch for energizing the solenoid coil 36 for actuating the plunger 35 in an upward direction and swinging the sector plate 31 to the position shown in Fig. 8, in which position the pivot 32 of the link 30 is to the right of dead center.

The weight of the material in the receptacle 17 becomes effective for automatically opening the gate 24 when the pivot point 32 is beyond dead center, as above explained. The contents of the receptacle may be caught in a bag or container under the chute 68. As soon as the material is discharged from the receptacle 17, the door 24 will automatically swing to its closed position, as before explained.

It will be appreciated that the container 66 may be manually placed in position to actuate the switch lever 65 if no supplemental machine is used. Further, the switch 47 may be maintained in closed position, or a manually operable switch may be substituted in the event no supplemental machine is used, so that a container may be put under the chute 68 at any time while the receptacle 17 is being filled.

It will be apparent from the foregoing that a novel weighing machine has been devised for weighing predetermined amounts of material and automatically discharging the same into a container and a machine that is very accurate and precise in delivering the desired weight.

I am aware that many changes may be made and numerous details of construction may be varied through a wide range without departing from the principles of this invention, and I therefore, do not purpose limiting the patent granted hereon otherwise than necessitated by the scope of the appended claims.

I claim as my invention:

1. In a weighing machine, a receptacle, a movable deflector for diverting material from a material stream into said receptacle, a scale element having means for supporting said receptacle and responsive to the weight thereof, a door normally closing the bottom of said receptacle, means for normally maintaining said door in closed position against the weight of material in said receptacle including a movable member, means responsive to the movement of said scale element in one direction for shifting said member to allow the material in said receptacle to open said door, and coacting means between said member and deflector for holding said deflector in a predetermined position relative to said stream when said door is open.

2. In a machine of the class described, a receptacle having a biased lower end, a door hinged to said receptacle and automatically movable to close said biased end, a deflector adapted to extend into a stream of material and divert material into said receptacle and means for controlling said deflector according to the position of said door.

3. In a machine of the class described, a receptacle, a movable scale element having means for supporting said receptacle and responsive to the weight thereof, a door hinged to the bottom of said receptacle, a movable deflector, adapted for supplying material to said receptacle, a sector plate pivotally mounted adjacent said deflector, a connection between said plate and door, means responsive to the movement of said scale element in one direction for swinging said plate and means on said deflector engageable by said plate when it is swung by said means for maintaining said deflector in a predetermined position.

4. In a machine of the class described, a receptacle having a discharge outlet, a door normally closing said outlet, a movable deflector for diverting material from a material stream to said receptacle, means for normally maintaining said door in closed position, a scale element having means for supporting said receptacle and responsive to the weight thereof, means responsive to the movement of the scale element in one direction for shifting said door holding means and means coacting with said door holding means in its shifted position for maintaining said deflector in a predetermined position relative to said stream.

5. In a machine of the class described, a receptacle having a discharge outlet, a door for normally closing said outlet, a movable deflector fbor supplying material to said receptacle, a link pivoted to said door, a sector plate pivoted to said machine and connected to said link, a scale beam having means for supporting said receptacle and responsive to the weight thereof, means responsive to the movement of said scale beam to balanced position for swinging said plate and a roller carried by said deflector under which said plate engages when it is swung by said means.

6. In a machine of the character described, weighing mechanism including a material receiving receptacle, a discharge gate through which weighed material in the receptacle may be released into a container, a deflector for diverting material from a material stream into said receptacle, means for moving the deflector in response to the weighing operation to vary the amount of material being deflected, and means for retaining the deflector out of the material stream during discharge of material in the receptacle through said gate.

7. In a machine of the character described, weighing mechanism including a material receiving receptacle, a discharge gate through which weighed material in the receptacle may be released into a container, a deflector for variably diverting material from a material stream in response to the weighing operation, and means for latchingly retaining the deflector out of the material stream during discharge of material through the gate from the receptacle.

8. In a machine of the character described, weighing means including a receptacle having a discharge outlet, a door for normally closing said outlet, a deflector carried by and movable with said receptacle during a weighing operation for diverting material into said receptacle from a material stream, means for moving said deflector out of the material stream when a predetermined amount of material has been diverted into the receptacle, and means responsive to the opening of said door for opposing movement of the deflector back into the material stream.

9. In a machine of the character described, weighing means including a receptacle having a discharge outlet, a door for normally closing said outlet, a deflector supported for pivotal movements into and out of a material stream in response to movements of the receptacle during a weighing operation for variably diverting material from the material stream into the receptacle, means for actuating the door to open position when a predetermined amount of material has been diverted into said receptacle, and means responsive to the opening of said door for opposing pivotal movement of the deflector into the stream.

10. In a machine of the character described, weighing means including a receptacle having a discharge outlet, a door normally closing said outlet, a deflector for diverting material from a material stream into said receptacle, means supporting said deflector including a pivotal connection adjacent one end with said receptacle, whereby the deflector is swung into and out of the material stream in response to raising and lowering movements of the receptacle during a weighing operation, and means actuated by the opening movement of said door to a position opposing swinging movement of the deflector into the material stream.

11. In a weighing machine, a scale element including a material receiving receptacle, a door normally closing the bottom of said receptacle, a deflector for diverting material from a material stream into said receptacle, a set of contacts responsive to movement of said scale element and arranged to close when a predetermined amount of material has been received by said receptacle, and means energized when said contacts are closed for actuating said door to open position and for retaining the deflector out of the material stream during the discharge of material from the receptacle through said door.

12. In a weighing machine, a scale element including a material receiving receptacle having a door normally closing the receptacle bottom and adapted to be discharged into a container located below the receptacle bottom, a deflector for diverting material from a material stream into said receptacle, means for opening said door, means for retaining the deflector out of said stream, a first set of contacts closed by the positioning of said container in said location, a second set of contacts responsive to movement of said scale element and arranged to close when a predetermined amount of material has been received by said receptacle, and mechanism including electromagnetic means energizable by the closing of both of said sets of contacts to actuate said door opening means and said deflector retaining means.

13. In a weighing machine, a scale element including a material receiving receptacle having a door normally closing the receptacle bottom and adapted to be discharged into a container located below the receptacle bottom, a conveyor for bringing containers into filling location below said receptacle, a deflector for diverting material from a material stream into said receptacle, means for opening said door, means for retaining the deflector out of said stream, a movable member shiftable to actuate said door opening means and said deflector retaining means, a first set of contacts closed by the positioning of one of said containers in said location, a second set of contacts responsive to movement of said scale means and arranged to close when a predetermined amount of material has been received by said receptacle, and mechanism including electromagnetic means energizable by the closing of both of said sets of contacts to shift said movable member into actuating position for opening said door and retaining the deflector out of said stream.

LEON J. NOWAK, JR.